US012617634B2

(12) United States Patent (10) Patent No.: US 12,617,634 B2
Nakamura et al. (45) Date of Patent: May 5, 2026

(54) LINEAR CONVEYANCE SYSTEM

(71) Applicant: Mitsubishi Electric Corporation,
Tokyo (JP)

(72) Inventors: Yuichiro Nakamura, Tokyo (JP);
Shinichi Yamaguchi, Tokyo (JP);
Hideaki Arita, Tokyo (JP)

(73) Assignee: **MITSUBISHI ELECTRIC
CORPORATION**, Tokyo (JP)

( * ) Notice: Subject to any disclaimer, the term of this
patent is extended or adjusted under 35
U.S.C. 154(b) by 99 days.

(21) Appl. No.: 18/839,753

(22) PCT Filed: Mar. 2, 2022

(86) PCT No.: PCT/JP2022/008807
§ 371 (c)(1),
(2) Date: Aug. 20, 2024

(87) PCT Pub. No.: WO2023/166598
PCT Pub. Date: Sep. 7, 2023

(65) Prior Publication Data
US 2025/0162823 A1 May 22, 2025

(51) Int. Cl.
*B65G 54/02* (2006.01)
*B61B 13/08* (2006.01)
(Continued)

(52) U.S. Cl.
CPC .............. *B65G 54/02* (2013.01); *H02K 3/28* (2013.01)

(58) Field of Classification Search
None
See application file for complete search history.

(56) References Cited

U.S. PATENT DOCUMENTS 7,199,492 B2 * 4/2007 Hashimoto ............ H02K 41/03
310/12.25
7,287,749 B2 * 10/2007 Frank .................... B65H 20/16
271/225
(Continued)

FOREIGN PATENT DOCUMENTS

JP 2001286008 A * 10/2001
JP 2005-033980 A 2/2005
(Continued)

OTHER PUBLICATIONS

International Search Report and Written Opinion mailed on May 31,
2022, received for PCT Application PCT/JP2022/008807, filed on
Mar. 2, 2022, 8 pages including English Translation.

*Primary Examiner* — Gene O Crawford
*Assistant Examiner* — Muhammad Awais
(74) *Attorney, Agent, or Firm* — XSENSUS LLP

(57) ABSTRACT

A linear conveyance system includes a plurality of stator
modules forming a conveyance path, and a mover including
a plurality of magnets disposed on both side surfaces. The
plurality of stator modules includes a one-side stator module
and a both-side stator module, the one-side stator module
being disposed on one side of a non-branch portion of the
conveyance path, the both-side stator module being disposed
on both sides of a branch portion of the conveyance path.
Each of the one-side stator module and the both-side stator
module includes an iron core and a plurality of coils. The
mover is propelled by electromagnetic force produced by the
plurality of coils. A coil amount of the one-side stator
module is equal to a coil amount of the both-side stator
module.

15 Claims, 8 Drawing Sheets

(51) Int. Cl.
    *B61B 13/12*       (2006.01)
    *H02K 3/28*       (2006.01)

(56)           References Cited

U.S. PATENT DOCUMENTS

| | | | | |
|---|---|---|---|---|
| 8,616,134 | B2 * | 12/2013 | King | B65G 35/06 |
| | | | | 104/284 |
| 8,967,051 | B2 | 3/2015 | King et al. | |
| 9,802,507 | B2 * | 10/2017 | Clark | B60L 15/005 |
| 11,618,632 | B2 * | 4/2023 | Hogan | B65G 54/02 |
| | | | | 198/619 |
| 11,724,894 | B2 * | 8/2023 | Ueno | B65G 54/02 |
| | | | | 198/619 |
| 2017/0346379 | A1 * | 11/2017 | Weber | G05B 13/024 |
| 2019/0218038 | A1 * | 7/2019 | Monti | B65G 35/063 |
| 2019/0389675 | A1 * | 12/2019 | Kleinikkink | H02K 11/0141 |

FOREIGN PATENT DOCUMENTS

| | | | | | |
|---|---|---|---|---|---|
| JP | 2005-139002 | A | | 6/2005 | |
| JP | 2009177888 | A | * | 8/2009 | |
| JP | 2012-515130 | A | | 7/2012 | |
| JP | 2012-516130 | A | | 7/2012 | |
| JP | 6633516 | B2 | | 1/2020 | |
| WO | WO-2012066868 | A1 | * | 5/2012 | H02K 41/033 |
| WO | WO-2019171456 | A1 | * | 9/2019 | B60L 13/03 |

* cited by examiner

22D

221D

DIRECTION
OF TRAVEL z

3

222D

LINEAR CONVEYANCE SYSTEM

CROSS-REFERENCE TO RELATED APPLICATION

This application is a national stage application, pursuant to 35 U.S.C. § 371, of International Patent Application No. PCT/JP2022/008807, filed Mar. 2, 2022, the entire contents of which are incorporated herein by reference.

FIELD

The present disclosure relates to a linear conveyance system that uses thrust of a linear motor.

BACKGROUND

There is known a technique in which a mover with a plurality of magnets attached thereto moves along a linear guide including a plurality of stator modules, and electromagnetic force enables a path to be branched, and also enables paths to be merged. For example, Patent Literature 1 discloses an invention in which coils of a stator are disposed on both sides in a branch section, and coils on one side are energized to apply lateral force that causes a mover to move in a branch direction.

CITATION LIST

Patent Literature

Patent Literature 1: Japanese Patent No. 6633516

SUMMARY OF INVENTION

Problem to be Solved by the Invention

However, since the same coils as coils disposed at a non-branch portion are disposed on both sides of a branch portion in the conventional linear conveyance system, the conventional linear conveyance system has a problem in that the weight of a motor increases. Furthermore, in a case where the same inverters are used for the branch portion and the non-branch portion, with coils disposed on both sides only in the branch portion, half of the coils of the branch portion just need to be energized so as to generate equal thrust in the branch portion and the non-branch portion. Thus, some of the inverters are not utilized. Alternatively, current flowing through the branch portion is ½ of current flowing through the non-branch portion, so that only ½ of performance of the inverter can be utilized. Thus, the conventional linear conveyance system has a problem in that the inverter increases in size.

The present disclosure has been made in view of the above, and an object of the present disclosure is to obtain a linear conveyance system that reduces the weight of a motor and the capacity of an inverter, and contributes to miniaturization of the inverter.

Means to Solve the Problem

In order to solve the above-described problems and achieve the object, a linear conveyance system according to the present disclosure includes a plurality of stator modules forming a conveyance path, and a mover including a plurality of magnets disposed on both side surfaces. The plurality of stator modules includes a one-side stator module and a both-side stator module, the one-side stator module being disposed on one side of a non-branch portion of the conveyance path, the both-side stator module being disposed on both sides of a branch portion of the conveyance path. Each of the one-side stator module and the both-side stator module includes an iron core and a plurality of coils. The mover is propelled by electromagnetic force produced by the plurality of coils. The both-side stator module includes two stator modules. A coil amount of the one-side stator module is equal to a coil amount of the both-side stator module, the one-side stator module being disposed at the non-branch portion of the conveyance path, the both-side stator module being disposed at the branch portion of the conveyance path.

Effects of the Invention

The linear conveyance system according to the present disclosure has an effect of reducing the weight of a motor and the capacity of an inverter and contributing to miniaturization of the inverter.

DESCRIPTION OF EMBODIMENTS

Hereinafter, linear conveyance systems according to embodiments will be described in detail with reference to the drawings.

First Embodiment

Figure 1:
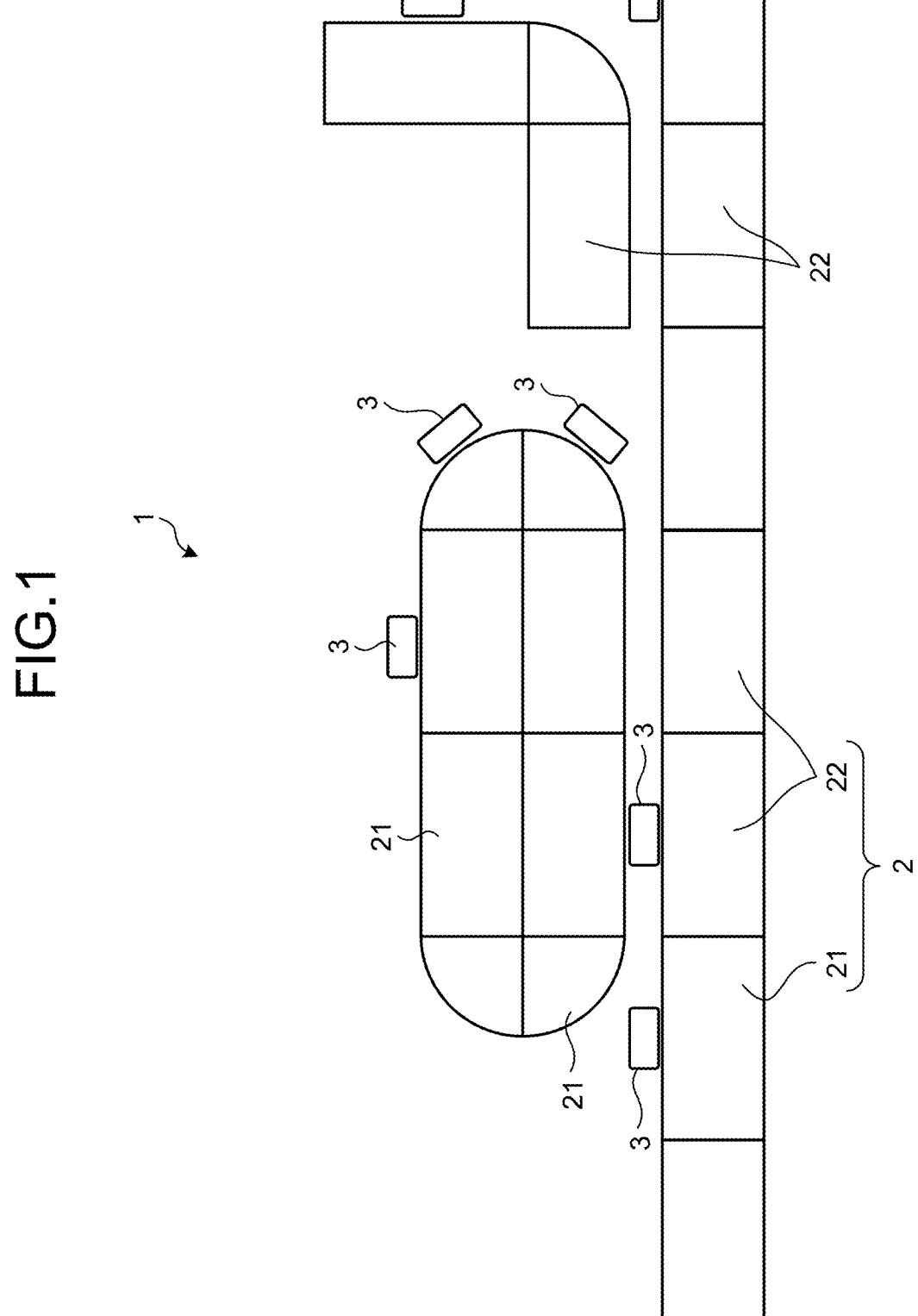
FIG. 1 is a diagram illustrating an overall configuration of a linear conveyance system according to a first embodiment.

FIG. 1 is a diagram illustrating an overall configuration of a linear conveyance system 1 according to a first embodiment. The linear conveyance system 1 includes a plurality of stator modules 2 forming a conveyance path. The plurality of stator modules 2 includes a one-side stator module 21 and a both-side stator module 22. The one-side stator module 21 is disposed on one side of a non-branch portion of the conveyance path. The both-side stator module 22 is disposed on both sides of a branch portion of the conveyance path. An example of the non-branch portion is a straight portion.

The linear conveyance system 1 includes a plurality of the one-side stator modules 21 and a plurality of the both-side stator modules 22. At the branch portion, a single convey- ance path branches into two conveyance paths, or two conveyance paths merge into a single conveyance path. The linear conveyance system 1 further includes a mover 3 including a plurality of magnets disposed on both side surfaces. The linear conveyance system 1 includes a plural- ity of the movers 3.

Figure 2:
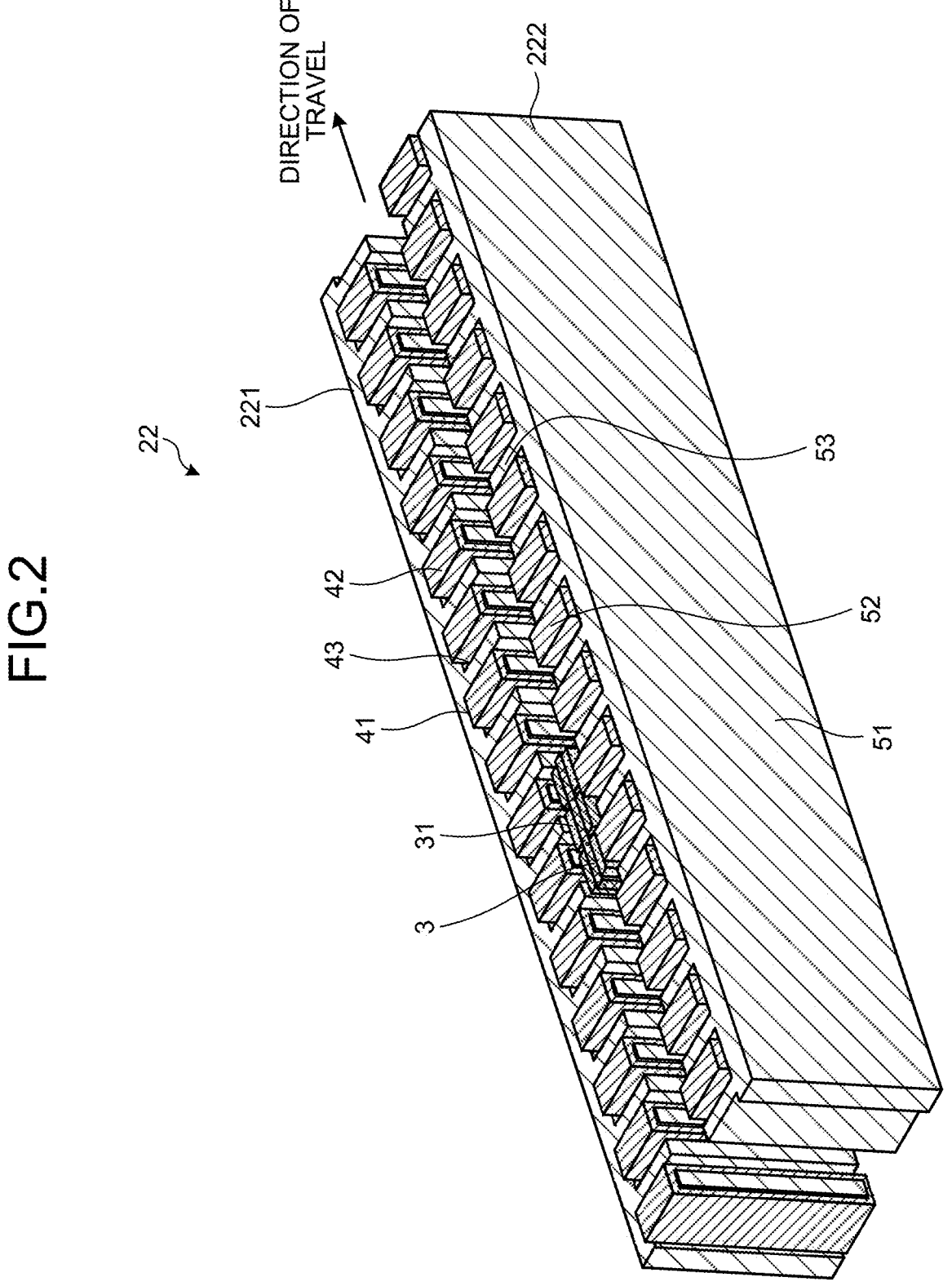
FIG. 2 is a perspective view of a both-side stator module included in the linear conveyance system according to the first embodiment.
Figure 3:
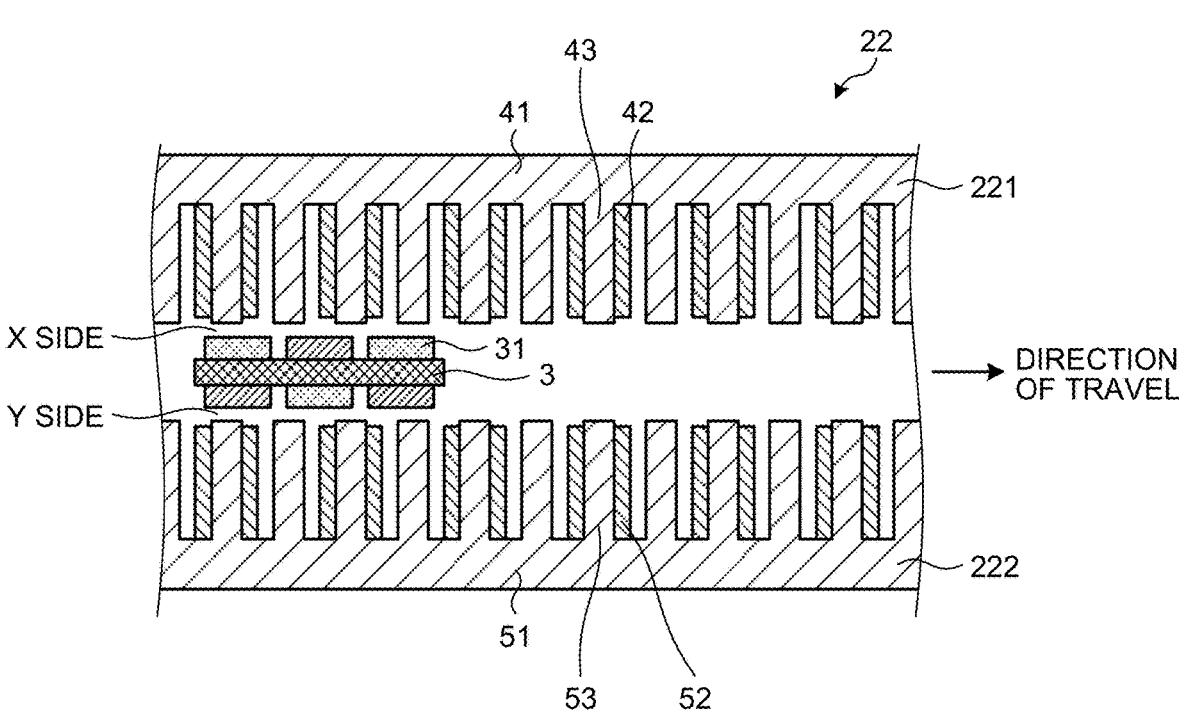
FIG. 3 is a cross-sectional view of the both-side stator module included in the linear conveyance system according to the first embodiment.

FIG. 2 is a perspective view of the both-side stator module 22 included in the linear conveyance system 1 according to the first embodiment. FIG. 3 is a cross-sectional view of the both-side stator module 22 included in the linear conveyance system 1 according to the first embodiment. FIGS. 2 and 3 also illustrate the mover 3. FIGS. 2 and 3 schematically illustrate the both-side stator module 22 and the mover 3. FIGS. 2 and 3 also illustrate a direction of travel of the mover 3.

The both-side stator module 22 includes two stator mod- ules. Specifically, the both-side stator module 22 includes a first stator module 221 and a second stator module 222. The first stator module 221 is one of the two stator modules included in the both-side stator module 22. The second stator module 222 is the other of the two stator modules included in the both-side stator module 22. The first stator module 221 is disposed on one side of the branch portion of the con- veyance path, and the second stator module 222 is disposed on the other side of the branch portion of the conveyance path.

The first stator module 221 includes an iron core 41 and a plurality of coils 42. The iron core 41 has a plurality of teeth 43. Each of the plurality of coils 42 is wound around any one of the plurality of teeth 43. The second stator module 222 includes an iron core 51 and a plurality of coils 52. The iron core 51 has a plurality of teeth 53. Each of the plurality of coils 52 is wound around any one of the plurality of teeth 53. The number of teeth 43 included in the first stator module 221 and the number of teeth 53 included in the second stator module 222 are even numbers.

For each of the first stator module 221 and the second stator module 222, the teeth 43 and 53 around which the coils 42 and 52 are wound and the teeth 43 and 53 around which no coils 42 and 52 are wound, respectively, are alternately arranged in the direction of travel of the mover 3. Furthermore, the teeth 43 around which the coils 42 are wound in the first stator module 221 face the teeth 53 around which the coils 52 are wound in the second stator module 222. The teeth 43 around which no coils 42 are wound in the first stator module 221 face the teeth 53 around which no coils 52 are wound in the second stator module 222.

The mover 3 includes a plurality of magnets 31 disposed on both side surfaces. The mover 3 is located between the first stator module 221 and the second stator module 222 at the branch portion of the conveyance path, and is propelled by electromagnetic force produced by the plurality of coils 42 included in the first stator module 221 or the plurality of coils 52 included in the second stator module 222. Each of the plurality of movers 3 is independently controlled in the conveyance path. A motor drive control device (not illus- trated) supplies current to each coil of the stator module 2 located in the vicinity of the mover 3. For example, the current is not UVW three-phase alternating current, but is single-phase alternating current that allows each phase to be independently controlled. Thus, the current is supplied to each coil in a desired waveform.

Figure 4:
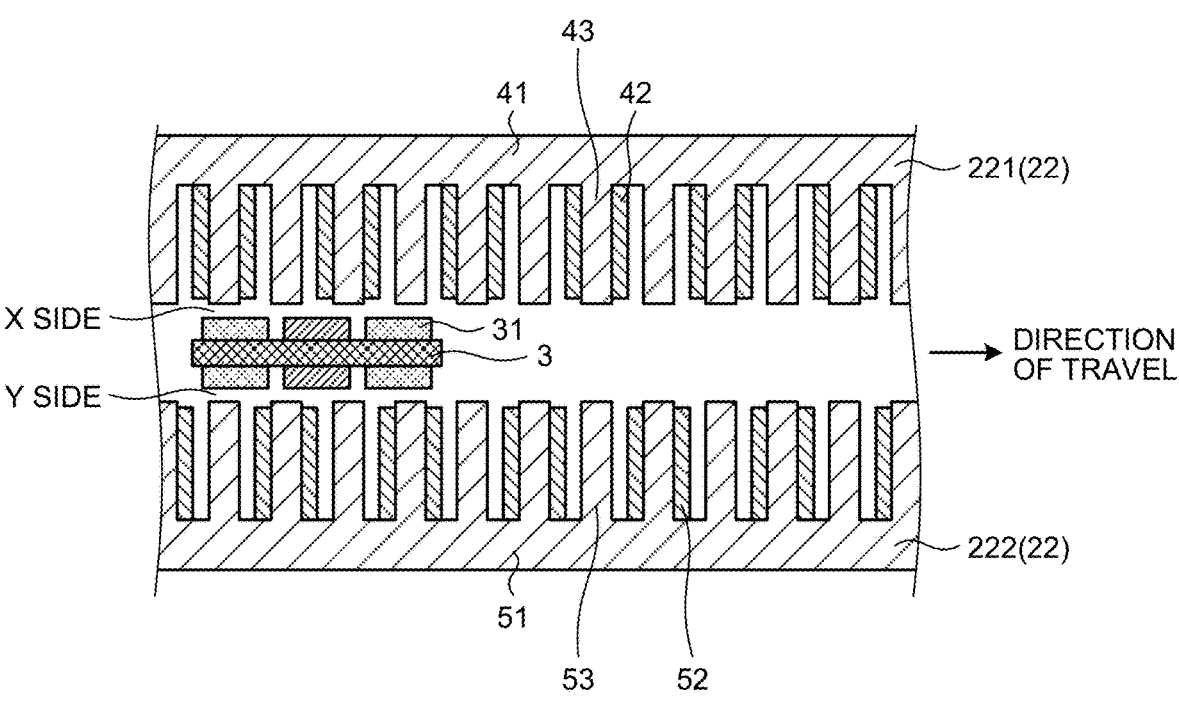
FIG. 4 is a cross-sectional view of a mover included in a linear conveyance system according to a first modification of the first embodiment.
Figure 5:
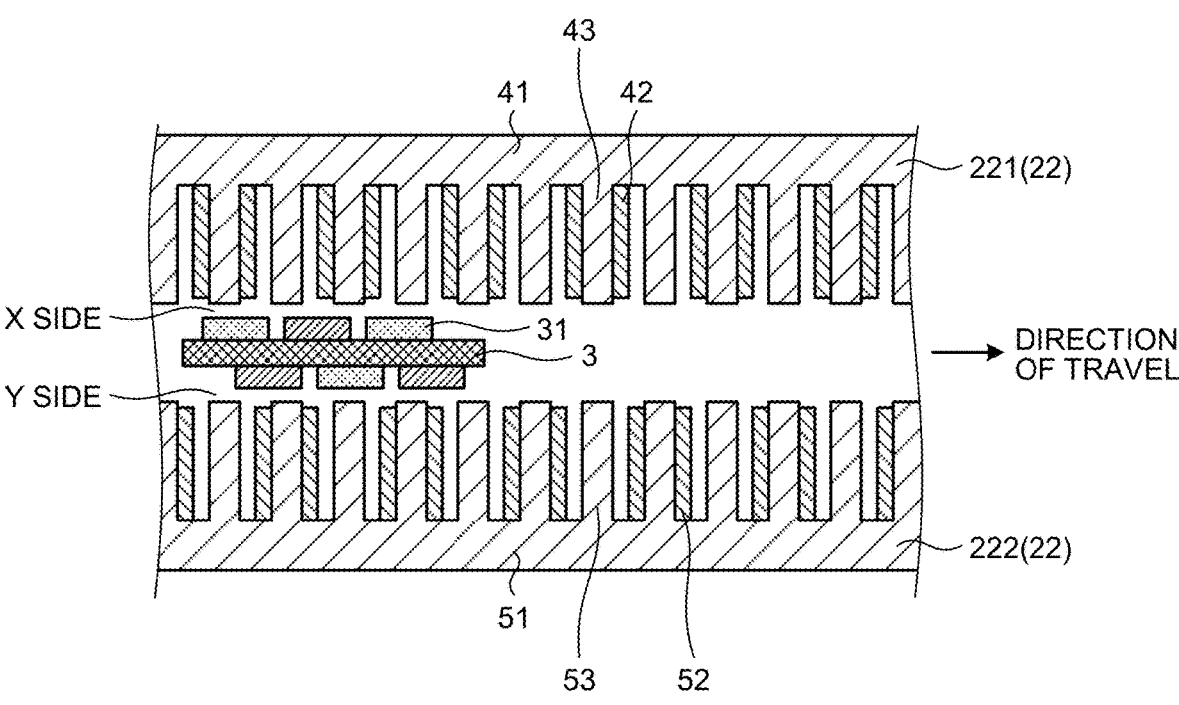
FIG. 5 is a cross-sectional view of a mover included in a linear conveyance system according to a second modification of the first embodiment.

As described above, the mover 3 includes the plurality of magnets 31 disposed on both side surfaces. With regard to arrangement the magnets 31 on both side surfaces of the mover 3, the direction of a magnetic pole of the magnet 31 on a side surface of the mover 3 facing the first stator module 221 is opposite to the direction of a magnetic pole of the magnet 31 on a side surface of the mover 3 facing the second stator module 222. In the first embodiment, an X side is defined as the side of the mover 3 facing the first stator module 221, and a Y side is defined as the side of the mover 3 facing the second stator module 222. The magnets 31 may be arranged in the same manner on the X side and the Y side. FIG. 4 is a cross-sectional view of the mover 3 included in a linear conveyance system according to a first modification of the first embodiment. FIG. 4 also illustrates the both-side stator module 22. FIG. 4 schematically illustrates the mover 3 and the both-side stator module 22. FIG. 4 also illustrates the direction of travel of the mover 3. FIG. 4 illustrates that the magnets 31 are arranged in the same manner on the X side and the Y side. Since the magnets 31 are arranged in the same manner on the X side and the Y side, a current command to be issued in a case where electromagnetic force acts on the X side coincides with a current command to be issued in a case where electromagnetic force acts on the Y side when thrust force is generated in the non-branch portion. Thus, control is facilitated. Arrangement of the magnets 31 on the X side may be shifted in the direction of travel with respect to arrangement of the magnets 31 on the Y side. Note that the coils 42 and the coils 52 may be disposed at the same positions as in FIG. 3. FIG. 5 is a cross-sectional view of the mover 3 included in a linear conveyance system according to a second modification of the first embodiment. FIG. 5 also illustrates the both-side stator module 22. FIG. 5 schematically illustrates the mover 3 and the both-side stator module 22. FIG. 5 also illustrates the direction of travel of the mover 3. FIG. 5 illustrates that arrangement of the magnets 31 on the X side is shifted by half a magnet pitch in the direction of travel with respect to arrangement of the magnets 31 on the Y side. Since arrange- ment of the magnets 31 on the X side is shifted in the direction of travel with respect to arrangement of the mag- nets 31 on the Y side, cogging thrust acting on the X side and cogging thrust acting on the Y side cancel each other. Thus, cogging thrust can be reduced. Cogging thrust is minimized when arrangement of the magnets 31 is shifted by half the magnet pitch as illustrated in FIG. 5. Note that the coils 42 and the coils 52 may be disposed at the same positions as in FIG. 3.

As described above, the mover 3 is located between the first stator module 221 and the second stator module 222 at the branch portion of the conveyance path. Each of the plurality of magnets 31 included in the mover 3 faces a side surface of the first stator module 221 or a side surface of the second stator module 22. In the both-side stator module 22 at the branch portion, a coil in the vicinity of the mover 3 is energized so as to guide the mover 3 to a selected path. As a result, the both-side stator module 22 causes electromagnetic force to act in a direction perpendicular to the direction of travel of the mover 3. Thus, the both-side stator module 22 causes the mover 3 to move.

Assume a case where the distance between the first stator module 221 and the X side of the mover 3 is smaller than the distance between the second stator module 222 and the Y side of the mover 3, and a user of the linear conveyance system 1 selects a path extending in a direction in which the distance between the second stator module 222 and the Y side of the mover 3 decreases. The linear conveyance system 1 causes the both-side stator module 22 to apply electromagnetic force in a direction from the X side to the Y side. As a result, the distance between the second stator module 222 and the Y side of the mover 3 becomes smaller than the distance between the first stator module 221 and the X side of the mover 3. Thus, the linear conveyance system 1 can cause the mover 3 to travel along the path extending in the direction in which the distance between the second stator module 222 and the Y side of the mover 3 decreases.

Figure 6:
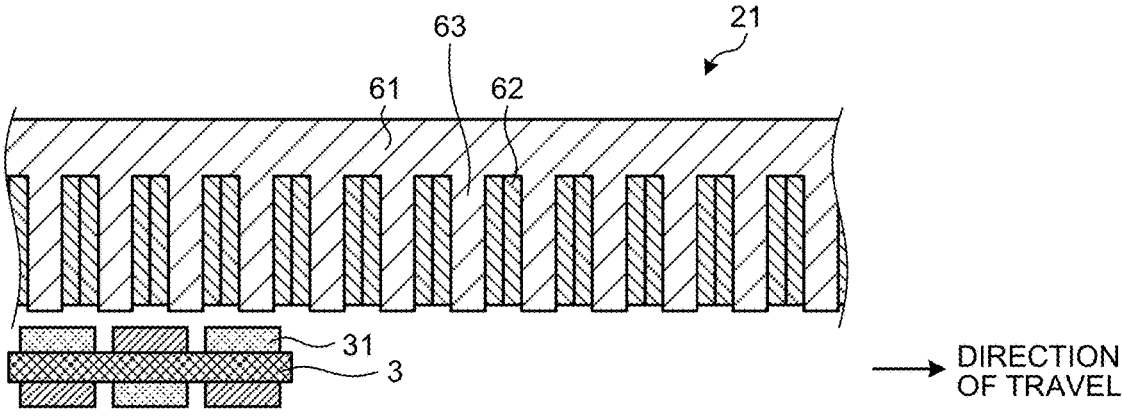
FIG. 6 is a cross-sectional view of a one-side stator module included in the linear conveyance system according to the first embodiment.

FIG. 6 is a cross-sectional view of the one-side stator module 21 included in the linear conveyance system 1 according to the first embodiment. FIG. 6 also illustrates the mover 3. FIG. 6 schematically illustrates the one-side stator module 21 and the mover 3. FIG. 6 also illustrates the direction of travel of the mover 3. As described above, the one-side stator module 21 is disposed on one side of the non-branch portion of the conveyance path. That is, the one-side stator module 21 is located on one side of the mover 3 at the non-branch portion.

The one-side stator module 21 includes an iron core 61 and a plurality of coils 62. The iron core 61 has a plurality of teeth 63. Each of the plurality of coils 62 is wound around any one of the plurality of teeth 63. The coil 62 is wound around each of the plurality of teeth 63. In the non-branch portion, the mover 3 is propelled by electromagnetic force produced by the plurality of coils 62.

The coil amount of the one-side stator module 21 disposed at the non-branch portion of the conveyance path is equal to the coil amount of the both-side stator module 22 disposed at the branch portion of the conveyance path.

As described above, for each of the first stator module 221 and the second stator module 222, the teeth 43 and 53 around which the coils 42 and 52 are wound and the teeth 43 and 53 around which no coils 42 and 52 are wound, respectively, are alternately arranged in the direction of travel of the mover 3. In addition, the number of teeth 43 included in the first stator module 221 and the number of teeth 53 included in the second stator module 222 are even numbers. That is, in the both-side stator module 22 disposed on both sides of the branch portion of the conveyance path, the number of teeth around which coils are wound is equal to the number of teeth around which no coils are wound.

When the effective value of current to be applied to each coil at the branch portion of the conveyance path is equal to the effective value of current to be applied to each coil at the non-branch portion of the conveyance path, the sum of thrusts to be generated in the both-side stator module 22 disposed at the branch portion is equal to the sum of thrusts to be generated in the one-side stator module 21 disposed at the non-branch portion.

As described above, the linear conveyance system 1 according to the first embodiment includes the one-side stator module 21 and the both-side stator module 22. The one-side stator module 21 is disposed on one side of the non-branch portion of the conveyance path. The both-side stator module 22 is disposed on both sides of the branch portion of the conveyance path. The both-side stator module

22 includes the first stator module 221 and the second stator module 222. Each of the first stator module 221 and the second stator module 222 has teeth around which no coils are wound. That is, in the first embodiment, the number of coils is reduced as compared with the conventional technique. The linear conveyance system 1 can reduce the weight of a motor by reducing the number of coils. In addition, according to the linear conveyance system 1, wiring work is reduced by the reduction in the number of coils, so that assembly of the motor is facilitated. The reduction in the number of coils enables the number of inverters (control devices) of the linear conveyance system 1 to be reduced.

In the linear conveyance system 1, the coil amount of the one-side stator module 21 disposed at the non-branch portion of the conveyance path is equal to the coil amount of the both-side stator module 22 disposed at the branch portion of the conveyance path. Therefore, in a case where the capacity of an inverter that supplies power to the one-side stator module 21 is equal to the capacity of an inverter that supplies power to the both-side stator module 22, the effective value of current flowing through a coil in the branch portion is equal to the effective value of current flowing through a coil in the non-branch portion when a specific thrust is output. That is, the load factor of the inverter in the branch portion is equal to the load factor of the inverter in the non-branch portion. That is, the linear conveyance system 1 can reduce the capacity of each inverter and thus contribute to miniaturization of the inverters.

Note that, for the plurality of teeth 43 and 53 included in the both-side stator module 22, the teeth 43 and 53 around which the coils 42 and 52 are wound and the teeth 43 and 53 around which no coils 42 and 52 are wound, respectively, are not always arranged alternately in the direction of travel of the mover 3. In the first embodiment, the coils 42 and 52 just need to be disposed on only some of the plurality of teeth 43 and 53, respectively.

Second Embodiment

Figure 7:
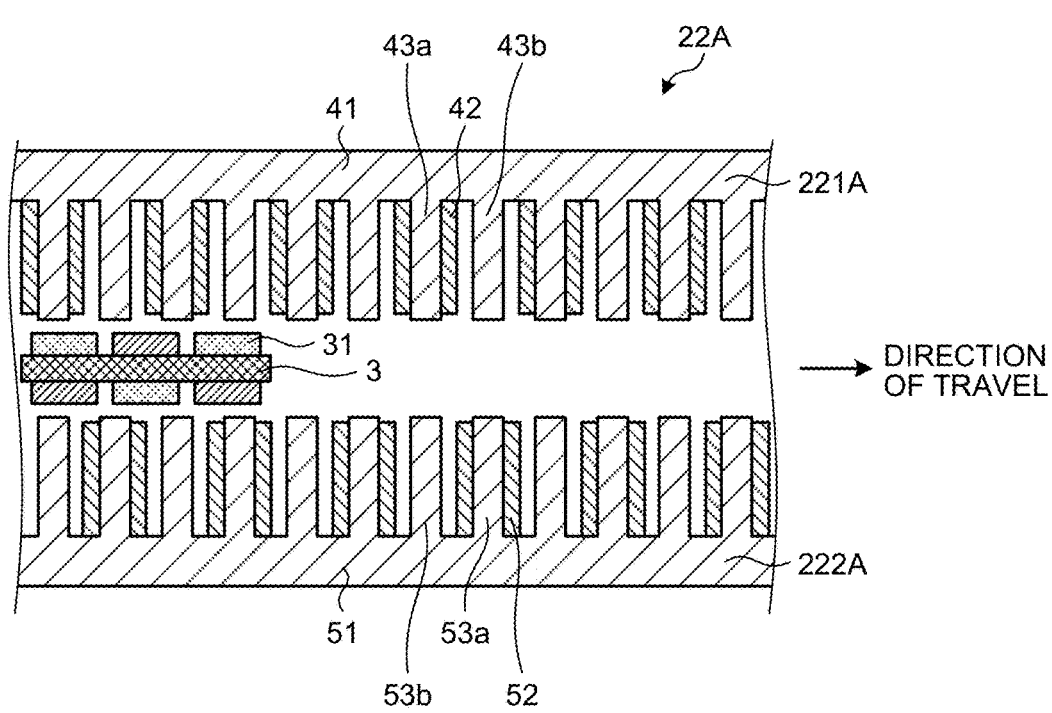
FIG. 7 is a cross-sectional view of a both-side stator module included in a linear conveyance system according to a second embodiment.

FIG. 7 is a cross-sectional view of a both-side stator module 22A included in a linear conveyance system according to a second embodiment. As with the linear conveyance system 1 according to the first embodiment, the linear conveyance system according to the second embodiment includes the one-side stator module 21 and the both-side stator module 22A. The both-side stator module 22A is disposed on both sides of a branch portion of a conveyance path. In the second embodiment, the one-side stator module 21 is not illustrated. The linear conveyance system according to the second embodiment further includes the mover 3 as with the linear conveyance system 1 according to the first embodiment. FIG. 7 also illustrates the mover 3. FIG. 7 schematically illustrates the both-side stator module 22A and the mover 3. FIG. 7 also illustrates the direction of travel of the mover 3.

The both-side stator module 22A, which is disposed on both sides of the branch portion of the conveyance path, includes two stator modules. Specifically, the both-side stator module 22A includes a first stator module 221A and a second stator module 222A. The first stator module 221A is one of the two stator modules included in the both-side stator module 22A. The second stator module 222A is the other of the two stator modules included in the both-side stator module 22A. The first stator module 221A is disposed on one side of the branch portion of the conveyance path, and the second stator module 222A is disposed on the other side of the branch portion of the conveyance path.

The first stator module 221A includes the iron core 41 and a plurality of the coils 42. The iron core 41 has a plurality of teeth 43a and 43b. Each of the plurality of coils 42 is wound around any one of the plurality of teeth 43a. In the first stator module 221A, the tooth 43a around which the coil 42 is wound and the tooth 43b around which no coil 42 is wound are alternately arranged in the direction of travel of the mover 3.

The second stator module 222A includes the iron core 51 and a plurality of the coils 52. The iron core 51 has a plurality of teeth 53a and 53b. Each of the plurality of coils 52 is wound around any one of the plurality of teeth 53a. In the second stator module 222A, the tooth 53a around which the coil 52 is wound and the tooth 53b around which no coil 52 is wound are alternately arranged in the direction of travel of the mover 3. The number of teeth 43a and 43b included in the first stator module 221A and the number of teeth 53a and 53b included in the second stator module 222A are even numbers.

Figure 8:
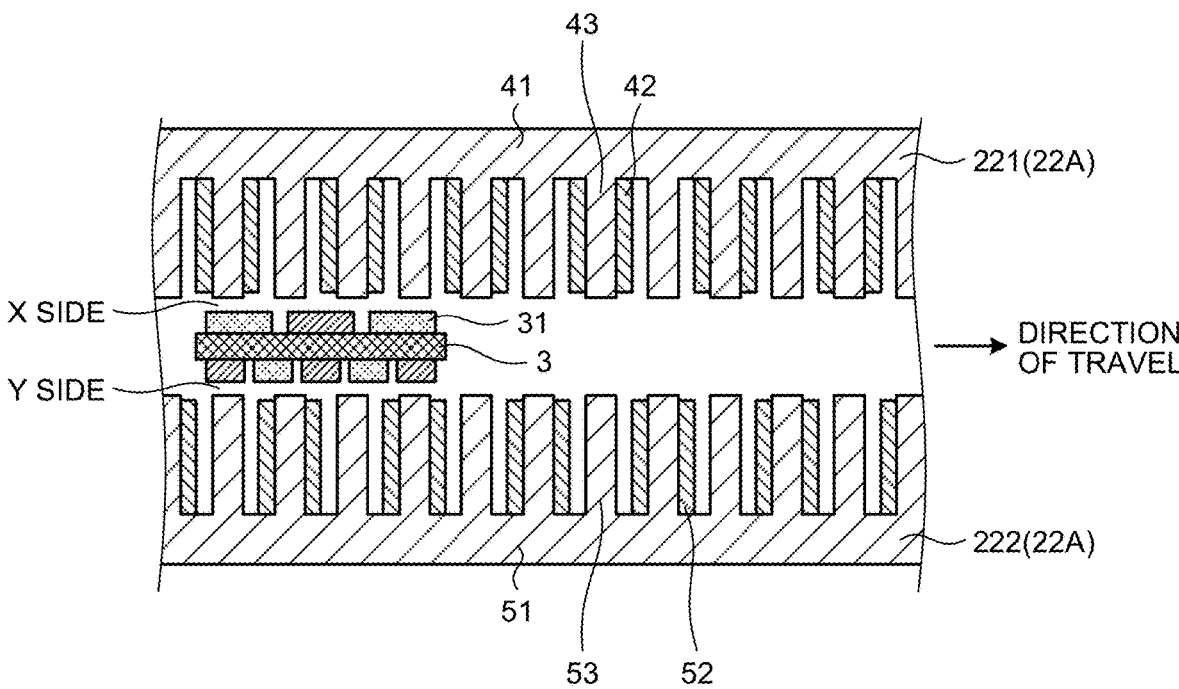
FIG. 8 is a cross-sectional view of a mover included in a linear conveyance system according to a modification of the second embodiment.

With regard to a tooth of the first stator module 221A and a tooth of the second stator module 222A facing each other, a coil is wound around a tooth of one of the first stator module 221A and the second stator module 222A, and no coil is wound around a tooth of the other of the first stator module 221A and the second stator module 222A. The number of magnets on an X side may be different from the number of magnets on a Y side. FIG. 8 is a cross-sectional view of the mover 3 included in a linear conveyance system according to a modification of the second embodiment. FIG. 8 also illustrates the both-side stator module 22A. FIG. 8 schematically illustrates the mover 3 and the both-side stator module 22A. FIG. 8 also illustrates the direction of travel of the mover 3. FIG. 8 illustrates that the number of magnets 31 on the X side is different from the number of magnets 31 on the Y side. Specifically, FIG. 8 illustrates the mover 3 including three magnets 31 on the X side and five magnets 31 on the Y side. When the number of magnets 31 on the X side is different from the number of magnets 31 on the Y side, it is possible to generate any desired thrust force and branch lateral force by energizing at least two or more coils even in a case where coils are alternately arranged. Note that the coils 42 and the coils 52 may be disposed at the same positions as in FIG. 3.

As described above, the linear conveyance system according to the second embodiment includes the one-side stator module 21 as with the linear conveyance system 1 according to the first embodiment. In the second embodiment, the number of turns in each coil in the one-side stator module 21 is equal to the number of turns in each coil in the both-side stator module 22A. As a result, a thrust constant obtained from thrust to be generated by energization of each coil divided by a current value in the branch portion is equal to a thrust constant obtained from thrust to be generated by energization of each coil divided by a current value in the non-branch portion.

In the linear conveyance system according to the second embodiment, when the linear conveyance system outputs equal thrust in the branch portion and the non-branch portion, the absolute value of a waveform of current flowing through the both-side stator module 22A disposed at the branch portion is equal to the absolute value of a waveform of current flowing through the one-side stator module 21 disposed at the non-branch portion. Therefore, it is easy to control current in the linear conveyance system according to the second embodiment. In addition, the smoothness of electromagnetic force acting on the mover 3 in the branch portion is equal to the smoothness of electromagnetic force acting on the mover 3 in the non-branch portion. Thus, the linear conveyance system according to the second embodiment can reduce thrust ripples.

Third Embodiment

Figure 9:
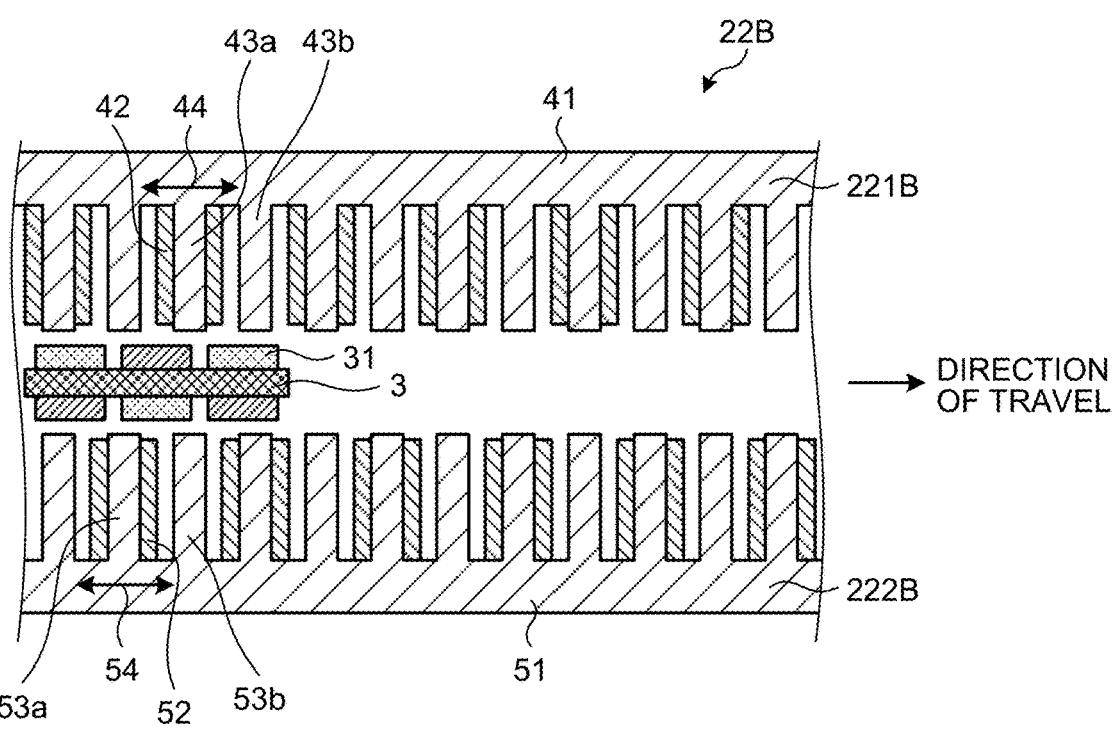
FIG. 9 is a cross-sectional view of a both-side stator module included in a linear conveyance system according to a third embodiment.

FIG. 9 is a cross-sectional view of a both-side stator module 22B included in a linear conveyance system according to a third embodiment. As with the linear conveyance system 1 according to the first embodiment, the linear conveyance system according to the third embodiment includes the one-side stator module 21 and the both-side stator module 22B. The both-side stator module 22B is disposed on both sides of a branch portion of a conveyance path. In the third embodiment, the one-side stator module 21 is not illustrated. The linear conveyance system according to the third embodiment further includes the mover 3 as with the linear conveyance system 1 according to the first embodiment. FIG. 9 also illustrates the mover 3. FIG. 9 schematically illustrates the both-side stator module 22B and the mover 3. FIG. 9 also illustrates the direction of travel of the mover 3.

The both-side stator module 22B, which is disposed on both sides of the branch portion of the conveyance path, includes two stator modules. Specifically, the both-side stator module 22B includes a first stator module 221B and a second stator module 222B. The first stator module 221B is one of the two stator modules included in the both-side stator module 22B. The second stator module 222B is the other of the two stator modules included in the both-side stator module 22B. The first stator module 221B is disposed on one side of the branch portion of the conveyance path, and the second stator module 222B is disposed on the other side of the branch portion of the conveyance path.

The first stator module 221B includes the iron core 41 and a plurality of the coils 42. The iron core 41 has a plurality of teeth 43a and 43b. Each of the plurality of coils 42 is wound around any one of the plurality of teeth 43a. In the first stator module 221B, the tooth 43a around which the coil 42 is wound and the tooth 43b around which no coil 42 is wound are alternately arranged in the direction of travel of the mover 3.

The second stator module 222B includes the iron core 51 and a plurality of the coils 52. The iron core 51 has a plurality of teeth 53a and 53b. Each of the plurality of coils 52 is wound around any one of the plurality of teeth 53a. In the second stator module 222B, the tooth 53a around which the coil 52 is wound and the tooth 53b around which no coil 52 is wound are alternately arranged in the direction of travel of the mover 3. The number of teeth 43a and 43b included in the first stator module 221B and the number of teeth 53a and 53b included in the second stator module 222B are even numbers.

With regard to a tooth of the first stator module 221B and a tooth of the second stator module 222B facing each other, a coil is wound around a tooth of one of the first stator module 221B and the second stator module 222B, and no coil is wound around a tooth of the other of the first stator module 221B and the second stator module 222B.

As illustrated in FIG. 9, in the third embodiment, the ratio of each of the plurality of coils 42 included in the both-side stator module 22B to a slot area 44 and the ratio of each of the plurality of coils 52 included in the both-side stator module 22B to a slot area 54 are each ½ or less. In the third embodiment, the type and diameter of coil wire used in the both-side stator module 22B disposed at the branch portion are the same as the type and diameter of coil wire used in the one-side stator module 21 disposed at the non-branch portion.

In the third embodiment, since the type of coil is common to the branch portion and the non-branch portion, the linear conveyance system according to the third embodiment enables manufacturing cost to be reduced. In addition, since it is possible to ensure a sufficient insulation distance between two adjacent coils, pressure resistance of the linear conveyance system according to the third embodiment is improved.

Fourth Embodiment

Figure 10:
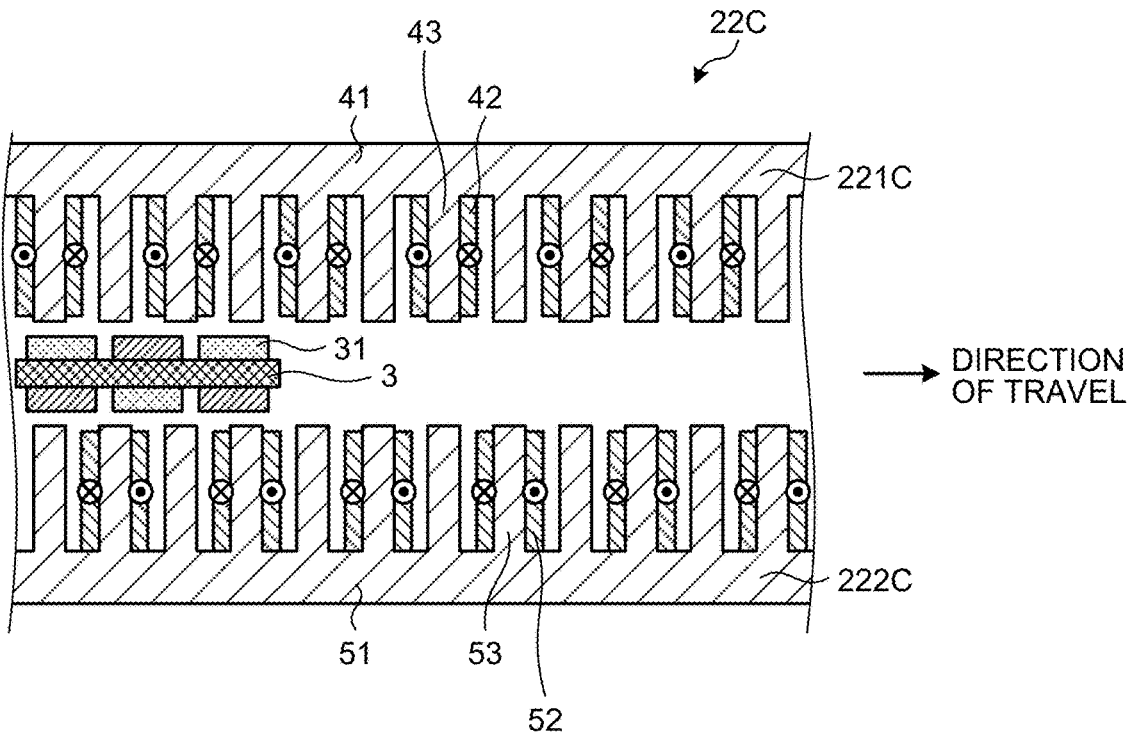
FIG. 10 is a cross-sectional view of a both-side stator module included in a linear conveyance system according to a fourth embodiment.

FIG. 10 is a cross-sectional view of a both-side stator module 22C included in a linear conveyance system according to a fourth embodiment. As with the linear conveyance system 1 according to the first embodiment, the linear conveyance system according to the fourth embodiment includes the one-side stator module 21 and the both-side stator module 22C. The both-side stator module 22C is disposed on both sides of a branch portion of a conveyance path. In the fourth embodiment, the one-side stator module 21 is not illustrated. The linear conveyance system according to the fourth embodiment further includes the mover 3 as with the linear conveyance system 1 according to the first embodiment. FIG. 10 also illustrates the mover 3. FIG. 10 schematically illustrates the both-side stator module 22C and the mover 3. FIG. 10 also illustrates the direction of travel of the mover 3.

The both-side stator module 22C, which is disposed on both sides of the branch portion of the conveyance path, includes two stator modules. Specifically, the both-side stator module 22C includes a first stator module 221C and a second stator module 222C. The first stator module 221C is one of the two stator modules included in the both-side stator module 22C. The second stator module 222C is the other of the two stator modules included in the both-side stator module 22C. The first stator module 221C is disposed on one side of the branch portion of the conveyance path, and the second stator module 222C is disposed on the other side of the branch portion of the conveyance path.

The first stator module 221C includes the iron core 41 and a plurality of the coils 42. The iron core 41 has a plurality of teeth 43. Each of the plurality of coils 42 is wound around any one of the plurality of teeth 43. In the first stator module 221C, the tooth 43 around which the coil 42 is wound and the tooth 43 around which no coil 42 is wound are alternately arranged in the direction of travel of the mover 3.

The second stator module 222C includes the iron core 51 and a plurality of the coils 52. The iron core 51 has a plurality of teeth 53. Each of the plurality of coils 52 is wound around any one of the plurality of teeth 53. In the second stator module 222C, the tooth 53 around which the coil 52 is wound and the tooth 53 around which no coil 52 is wound are alternately arranged in the direction of travel of the mover 3. The number of teeth 43 included in the first stator module 221C and the number of teeth 53 included in the second stator module 222C are even numbers.

With regard to the tooth 43 of the first stator module 221C and the tooth 53 of the second stator module 222C facing each other, a coil is wound around a tooth of one of the first stator module 221C and the second stator module 222C, and no coil is wound around a tooth of the other of the first stator module 221C and the second stator module 222C.

FIG. 10 illustrates a direction in which each of the plurality of coils 42 and the plurality of coils 52 is wound. In FIG. 10, a portion marked with a white circle and a black circle shown in the white circle indicates that at the marked portion, each coil is wound in a direction from the back side to the front side of the drawing. A portion marked with a white circle and a cross mark shown in the white circle indicates that at the marked portion, each coil is wound in a direction from the front side to the back side of the drawing.

As illustrated in FIG. 10, all the coils 42 included in the first stator module 221C are wound in the same direction, and all the coils 52 included in the second stator module 222C are wound in the same direction. The coils 42 included in the first stator module 221C and the coils 52 included in the second stator module 222C are wound in opposite directions. All the coils 62 included in the one-side stator module 21 are wound in the same direction.

In the linear conveyance system according to the fourth embodiment, induced voltages in the respective coils of the branch portion and the non-branch portion have the same waveform. Thus, in a case where the linear conveyance system outputs equal thrust in the branch portion and the non-branch portion, the waveform of current flowing through the both-side stator module 22C disposed on both sides of the branch portion of the conveyance path is the same as the waveform of current flowing through the one-side stator module 21 disposed at the non-branch portion of the conveyance path. As a result, control of current is further facilitated in the linear conveyance system according to the fourth embodiment. The induced voltage is counter electromotive force.

In the both-side stator module 22C, the second stator module 222C is a stator module obtained by 180° rotation of the same stator module as the first stator module 221C, and is disposed in such a way as to face the first stator module 221C. That is, it is possible to configure the two stator modules included in the both-side stator module 22C at the branch portion by using the same components. Thus, the linear conveyance system according to the fourth embodiment can reduce manufacturing cost.

Fifth Embodiment

Figure 11:
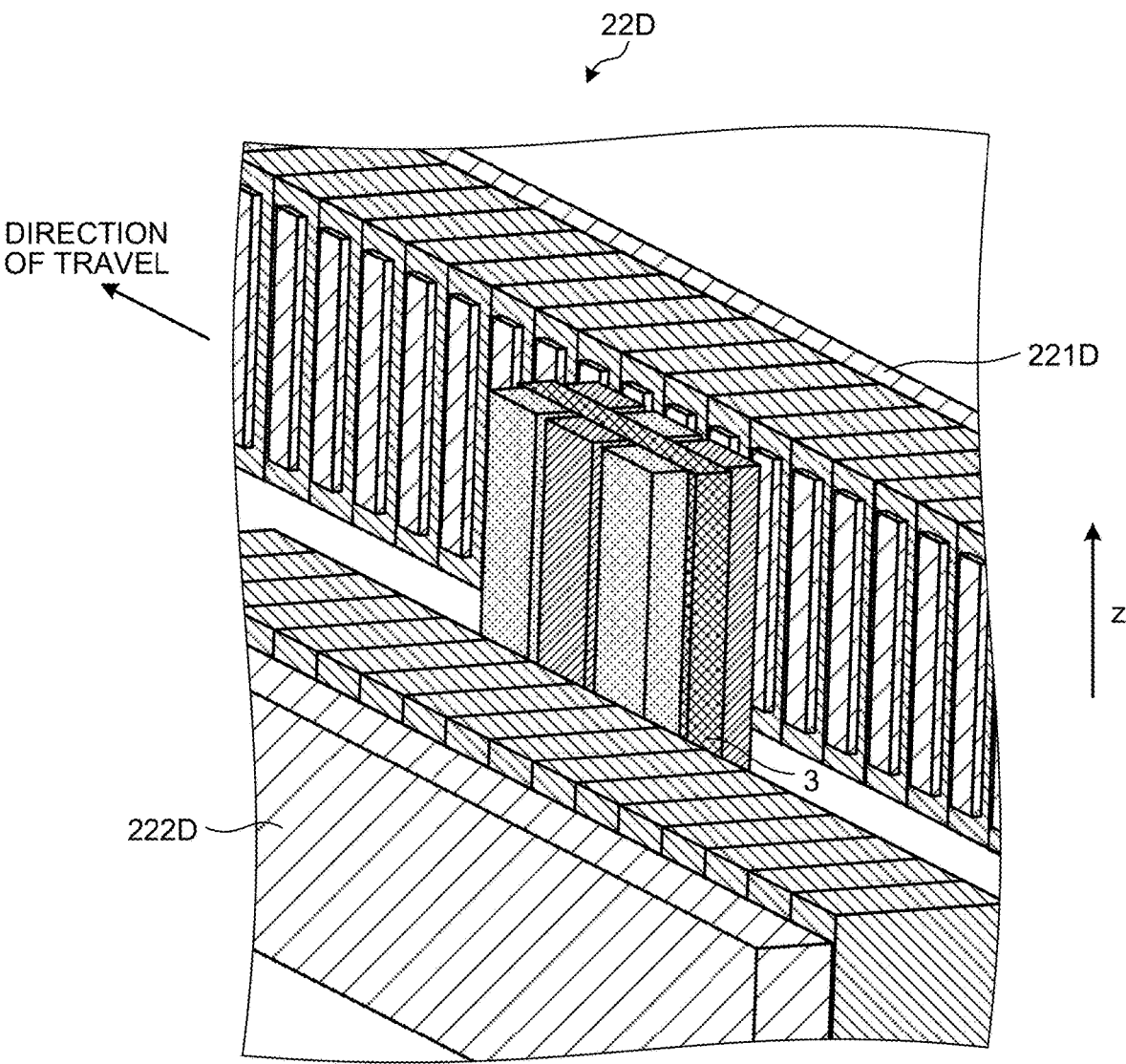
FIG. 11 is a perspective view of a both-side stator module included in a linear conveyance system according to a fifth embodiment.
Figure 12:
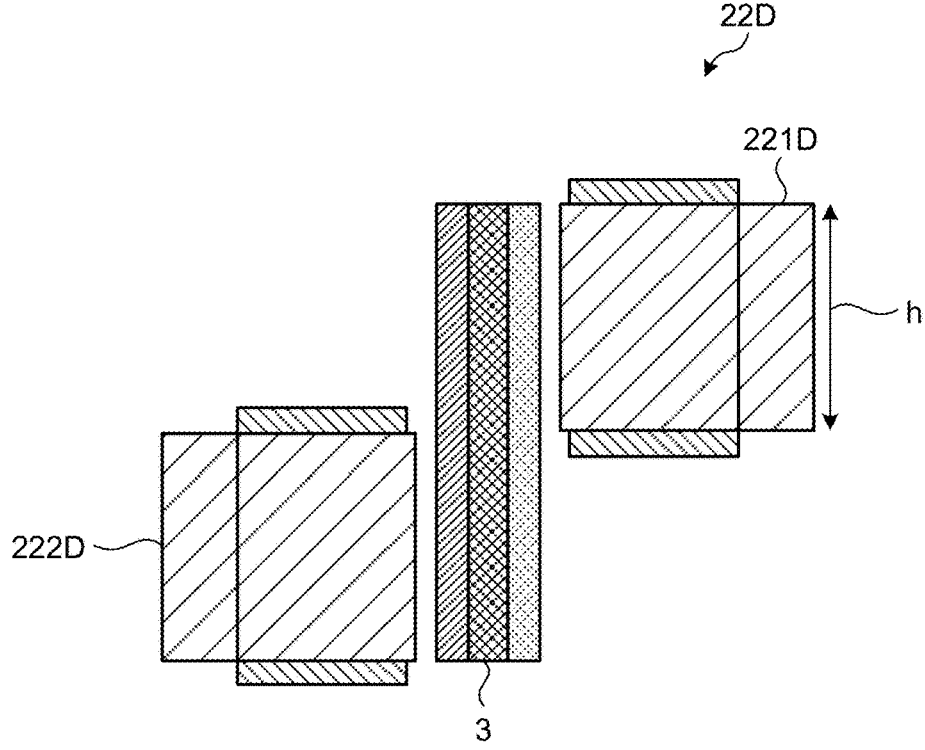
FIG. 12 is a first cross-sectional view of the both-side stator module included in the linear conveyance system according to the fifth embodiment.

FIG. 11 is a perspective view of a both-side stator module 22D included in a linear conveyance system according to a fifth embodiment. As with the linear conveyance system 1 according to the first embodiment, the linear conveyance system according to the fifth embodiment includes the one-side stator module 21 and the both-side stator module 22D. The both-side stator module 22D is disposed on both sides of a branch portion of a conveyance path. In the fifth embodiment, the one-side stator module 21 is not illustrated. The linear conveyance system according to the fifth embodiment further includes the mover 3 as with the linear conveyance system 1 according to the first embodiment. FIG. 11 also illustrates the mover 3. FIG. 11 also illustrates the direction of travel of the mover 3. FIG. 12 is a first cross-sectional view of the both-side stator module 22D included in the linear conveyance system according to the fifth embodiment. FIG. 12 also illustrates the mover 3. FIGS. 11 and 12 schematically illustrate the both-side stator module 22D and the mover 3.

The both-side stator module 22D, which is disposed on both sides of the branch portion of the conveyance path, includes two stator modules. Specifically, the both-side stator module 22D includes a first stator module 221D and a second stator module 222D. The first stator module 221D is one of the two stator modules included in the both-side stator module 22D. The second stator module 222D is the other of the two stator modules included in the both-side stator module 22D. The first stator module 221D is disposed on one side of the branch portion of the conveyance path, and the second stator module 222D is disposed on the other side of the branch portion of the conveyance path.

The first stator module 221D and the second stator module 222D do not face each other. Furthermore, the first stator module 221D and the second stator module 222D are disposed at different positions in a direction perpendicular to the direction of travel of the mover 3 and perpendicular to directions of lines of magnetic force to be produced by a plurality of the magnets 31 included in the mover 3 traveling through the both-side stator module 22D.

For example, when the conveyance path is provided on a plane parallel to a horizontal plane, the first stator module 221D and the second stator module 222D are disposed at different positions in a vertical direction z. Although details will be described below, the first stator module 221D and the second stator module 222D each have an iron core. For example, in the above case, the vertical direction z is parallel to a height direction h of each iron core. The height of each of the first stator module 221D and the second stator module 222D is ½ of the height of the one-side stator module 21 disposed on one side of the non-branch portion of the conveyance path.

Figure 13:
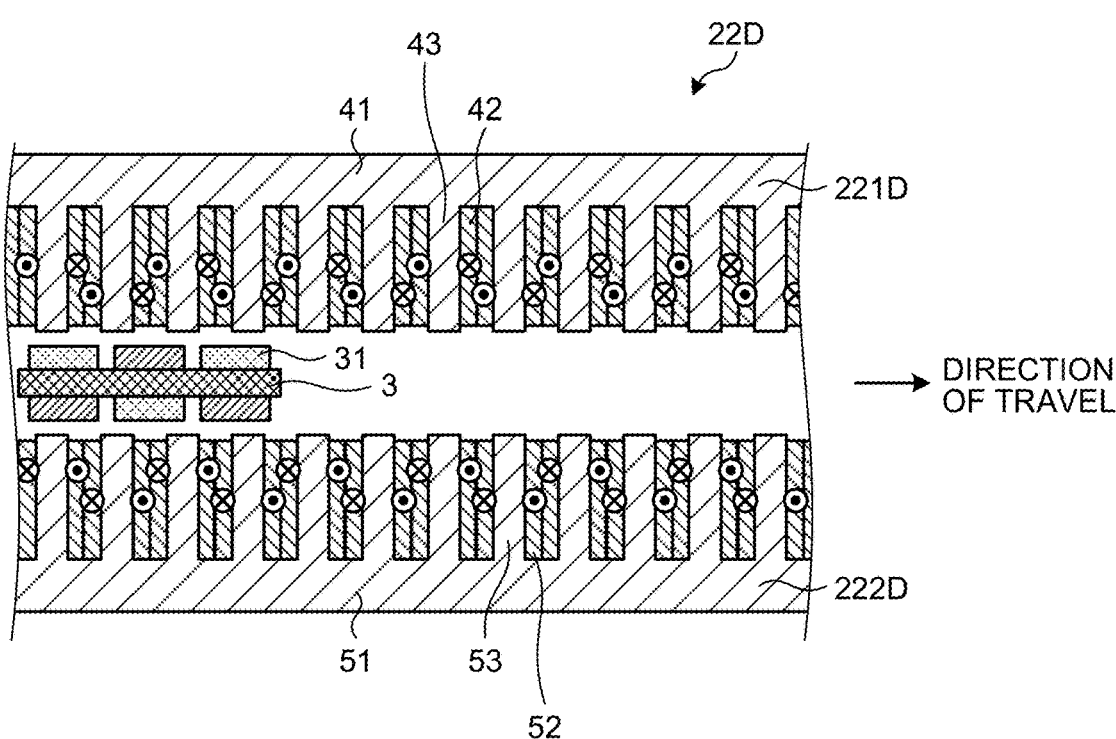
FIG. 13 is a second cross-sectional view of the both-side stator module included in the linear conveyance system according to the fifth embodiment.

FIG. 13 is a second cross-sectional view of the both-side stator module 22D included in the linear conveyance system according to the fifth embodiment. FIG. 13 also illustrates the mover 3. FIG. 13 schematically illustrates the both-side stator module 22D and the mover 3. FIG. 13 also illustrates the direction of travel of the mover 3.

The first stator module 221D includes the iron core 41 and a plurality of the coils 42. The iron core 41 has a plurality of teeth 43. Each of the plurality of coils 42 is wound around any one of the plurality of teeth 43. The coil 42 is wound around each of the teeth 43. The second stator module 222D includes the iron core 51 and a plurality of the coils 52. The iron core 51 has a plurality of teeth 53. Each of the plurality of coils 52 is wound around any one of the plurality of teeth 53. The coil 52 is wound around each of the teeth 53.

FIG. 13 illustrates a direction in which each of the plurality of coils 42 and the plurality of coils 52 is wound. In FIG. 13, a portion marked with a white circle and a black circle shown in the white circle indicates that at the marked portion, each coil is wound in a direction from the back side to the front side of the drawing. A portion marked with a white circle and a cross mark shown in the white circle indicates that at the marked portion, each coil is wound in a direction from the front side to the back side of the drawing.

As illustrated in FIG. 13, all the coils 42 included in the first stator module 221D are wound in the same direction, and all the coils 52 included in the second stator module 222D are wound in the same direction. The coils 42 included in the first stator module 221D and the coils 52 included in the second stator module 222D are wound in opposite directions. That is, the second stator module 222D is disposed in a state where the second stator module 222D is a stator module obtained by 180° rotation of the same stator module as the first stator module 221D. All of a plurality of the coils 62 included in the one-side stator module 21 are wound in the same direction.

As described above, in the linear conveyance system according to the fifth embodiment, the height of each of the first stator module 221D and the second stator module 222D included in the both-side stator modules 22D disposed on both sides of the branch portion of the conveyance path is ½ of the height of the one-side stator module 21 disposed on one side of the non-branch portion of the conveyance path. That is, the height of the iron core 41 included in the first stator module 221D and the height of the iron core 51 included in the second stator module 222D are each ½ of the height of the iron core 61 included in the one-side stator module 21. Therefore, the linear conveyance system according to the fifth embodiment can reduce the weight of a motor.

In the both-side stator module 22D, the second stator module 222D is disposed in a state where the second stator module 222D is a stator module obtained by 180° rotation of the same stator module as the first stator module 221D. That is, it is possible to configure the two stator modules included in the both-side stator module 22D at the branch portion by using the same components. Thus, the linear conveyance system according to the fifth embodiment can reduce manufacturing cost.

The configurations set forth in the above embodiments show examples, and it is possible to combine the configurations with another known technique or combine the embodiments with each other, and is also possible to partially omit or change the configurations without departing from the gist of the present disclosure.

REFERENCE SIGNS LIST 1 linear conveyance system; 2 stator module; 3 mover; 21 one-side stator module; 22, 22A, 22B, 22C, 22D both-side stator module; 31 magnet; 41, 51, 61 iron core; 42, 52, 62 coil; 43, 43a, 43b, 53, 53a, 53b, 63 tooth; 44, 54 slot area; 221, 221A, 221B, 221C, 221D first stator module; 222, 222A, 222B, 222C, 222D second stator module.

The invention claimed is:

1. A linear conveyance system comprising:
a plurality of stator modules forming a conveyance path; and
a mover including a plurality of magnets disposed on both side surfaces, wherein
the plurality of stator modules includes a one-side stator module and a both-side stator module, the one-side stator module being disposed on one side of a non-branch portion of the conveyance path, the both-side stator module being disposed on both sides of a branch portion of the conveyance path,
each of the one-side stator module and the both-side stator module includes an iron core and a plurality of coils,
the mover is propelled by electromagnetic force produced by the plurality of coils, and
a coil amount of the one-side stator module is equal to a coil amount of the both-side stator module, the one-side stator module being disposed at the non-branch portion of the conveyance path, the both-side stator module being disposed at the branch portion of the conveyance path.

2. The linear conveyance system according to claim 1, wherein
the iron core includes a plurality of teeth,
each of the plurality of coils is wound around any one of the plurality of teeth,
the coils are disposed on only some of the plurality of teeth in the both-side stator module, and
the coils are disposed on all of the plurality of teeth in the one-side stator module.

3. The linear conveyance system according to claim 1, wherein the iron core includes a plurality of teeth, each of the plurality of coils is wound around any one of the plurality of teeth, for each of a first stator module and a second stator module, a tooth around which a coil is wound and a tooth around which no coil is wound are alternately arranged in a direction of travel of the mover, the first stator module being one of two stator modules included in the both-side stator module, the second stator module being another of the two stator modules included in the both-side stator module, with regard to a tooth of the first stator module and a tooth of the second stator module facing each other, a coil is wound around a tooth of one of the first stator module and the second stator module, and no coil is wound around a tooth of another of the first stator module and the second stator module, a number of teeth included in each of the first stator module and the second stator module is an even number, and a number of turns in each coil in the one-side stator module is equal to a number of turns in each coil in the first stator module and the second stator module.

4. The linear conveyance system according to claim 1, wherein a ratio of each of the plurality of coils included in the both-side stator module to a slot area is ½ or less.

5. The linear conveyance system according to claim 3, wherein the plurality of coils included in the one-side stator module is wound in a same direction, a coil included in a first stator module and a coil included in a second stator module are wound in opposite directions, the first stator module being one of two stator modules included in the both-side stator module, the second stator module being another of the two stator modules included in the both-side stator module.

6. The linear conveyance system according to claim 1, wherein a first stator module and a second stator module do not face each other, and are disposed at different positions in a direction perpendicular to a direction of travel of the mover and perpendicular to directions of lines of magnetic force to be produced by the plurality of magnets included in the mover traveling through the both-side stator module, the first stator module being one of two stator modules included in the both-side stator module, the second stator module being another of the two stator modules included in the both-side stator module.

7. The linear conveyance system according to claim 2, wherein the iron core includes a plurality of teeth, each of the plurality of coils is wound around any one of the plurality of teeth, for each of a first stator module and a second stator module, a tooth around which a coil is wound and a tooth around which no coil is wound are alternately arranged in a direction of travel of the mover, the first stator module being one of two stator modules included in the both-side stator module, the second stator module being another of the two stator modules included in the both-side stator module, with regard to a tooth of the first stator module and a tooth of the second stator module facing each other, a coil is wound around a tooth of one of the first stator module and the second stator module, and no coil is wound around a tooth of another of the first stator module and the second stator module, a number of teeth included in each of the first stator module and the second stator module is an even number, and a number of turns in each coil in the one-side stator module is equal to a number of turns in each coil in the first stator module and the second stator module.

8. The linear conveyance system according to claim 2, wherein a ratio of each of the plurality of coils included in the both-side stator module to a slot area is ½ or less.

9. The linear conveyance system according to claim 3, wherein a ratio of each of the plurality of coils included in the both-side stator module to a slot area is ½ or less.

10. The linear conveyance system according to claim 7, wherein a ratio of each of the plurality of coils included in the both-side stator module to a slot area is ½ or less.

11. The linear conveyance system according to claim 7, wherein the plurality of coils included in the one-side stator module is wound in a same direction, a coil included in a first stator module and a coil included in a second stator module are wound in opposite directions, the first stator module being one of two stator modules included in the both-side stator module, the second stator module being another of the two stator modules included in the both-side stator module.

12. The linear conveyance system according to claim 4, wherein the plurality of coils included in the one-side stator module is wound in a same direction, a coil included in a first stator module and a coil included in a second stator module are wound in opposite directions, the first stator module being one of two stator modules included in the both-side stator module, the second stator module being another of the two stator modules included in the both-side stator module.

13. The linear conveyance system according to claim 8, wherein the plurality of coils included in the one-side stator module is wound in a same direction, a coil included in a first stator module and a coil included in a second stator module are wound in opposite directions, the first stator module being one of two stator modules included in the both-side stator module, the second stator module being another of the two stator modules included in the both-side stator module.

14. The linear conveyance system according to claim 9, wherein the plurality of coils included in the one-side stator module is wound in a same direction, a coil included in a first stator module and a coil included in a second stator module are wound in opposite directions, the first stator module being one of two stator modules included in the both-side stator module, the second stator module being another of the two stator modules included in the both-side stator module.

15. The linear conveyance system according to claim 10, wherein the plurality of coils included in the one-side stator module is wound in a same direction,

a coil included in a first stator module and a coil included in a second stator module are wound in opposite directions, the first stator module being one of two stator modules included in the both-side stator module, the second stator module being another of the two stator modules included in the both-side stator module.

* * * * *